US010853057B1

(12) United States Patent
Bowerman et al.

(10) Patent No.: US 10,853,057 B1
(45) Date of Patent: Dec. 1, 2020

(54) SOFTWARE LIBRARY VERSIONING WITH CACHING

(71) Applicant: Amazon Technologies, Inc., Seattle, WA (US)

(72) Inventors: Michael Bowerman, Seattle, WA (US); Azfar Matiur Khandoker, Seattle, WA (US); Kunal Arvindbhai Parmar, Bellevue, WA (US); Ankit Soni, Seattle, WA (US); Ali Reza Asghari, Seattle, WA (US); Brian Stein, Kent, WA (US); Vinay Chopra, Bellevue, WA (US); Igal Mizrahi, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/472,823

(22) Filed: Mar. 29, 2017

(51) Int. Cl.
*G06F 8/71* (2018.01)

(52) U.S. Cl.
CPC ..................... *G06F 8/71* (2013.01)

(58) Field of Classification Search
CPC ........................................................ G06F 8/71
See application file for complete search history.

(56) References Cited

U.S. PATENT DOCUMENTS

| | | | | |
|---|---|---|---|---|
| 6,675,205 B2* | 1/2004 | Meadway | ............. | G06F 16/152 709/219 |
| 6,751,735 B1* | 6/2004 | Schell | ................... | G06F 21/602 380/277 |
| 7,032,000 B2* | 4/2006 | Tripp | .................... | G06F 16/152 709/202 |
| 7,194,618 B1* | 3/2007 | Suominen | ............ | H04L 63/123 713/155 |
| 7,200,868 B2* | 4/2007 | Mattox | .................. | H04N 7/163 348/E7.056 |
| 7,461,249 B1* | 12/2008 | Pearson | .................. | G06F 21/10 705/59 |
| 7,665,075 B1* | 2/2010 | Daynes | ................... | G06F 9/445 717/148 |
| 7,814,472 B2* | 10/2010 | Atsatt | ................. | G06F 9/44563 717/166 |

(Continued)

OTHER PUBLICATIONS

U.S. Appl. No. 15/861,429, filed Jul. 3, 2018, Non-Final Office Action dated Jun. 25, 2019.

(Continued)

*Primary Examiner* — Chat C Do
*Assistant Examiner* — Douglas M Slachta
(74) *Attorney, Agent, or Firm* — Thomas Horstemeyer, LLP

(57) ABSTRACT

Disclosed are various embodiments for software library versioning with intelligent caching based on signatures. In one embodiment, a library is requested in response to a first dependency in a first network resource. The library is then received together with a signature that identifies a version of the library. The library is stored in a local cache on a client computing device that is indexed by library signatures. It is determined that a second network resource has a second dependency on the library. The library is loaded from the local cache in response to the second dependency specifying the library having the same signature.

20 Claims, 7 Drawing Sheets

(56) References Cited

U.S. PATENT DOCUMENTS

| | | | |
|---|---|---|---|
| 8,443,043 B2* | 5/2013 | Ogawa | G06Q 10/00 709/204 |
| 8,949,660 B1 | 2/2015 | Pupius et al. | |
| 8,954,732 B1* | 2/2015 | Watsen | H04L 9/3263 713/157 |
| 9,031,531 B2* | 5/2015 | Miluzzo | H04W 4/08 455/407 |
| 9,064,099 B2 | 6/2015 | Horning et al. | |
| 9,110,765 B2 | 8/2015 | Bolotnikoff et al. | |
| 9,147,086 B1* | 9/2015 | Potlapally | G06F 21/64 |
| 9,189,515 B1* | 11/2015 | Tamilmani | G06F 16/24532 |
| 9,471,466 B1 | 10/2016 | Garcia | |
| 9,509,736 B2* | 11/2016 | Rhea | H04L 65/60 |
| 9,594,512 B1* | 3/2017 | Cao | G06F 3/0619 |
| 9,729,524 B1* | 8/2017 | Brandwine | H04L 63/0457 |
| 9,886,448 B2* | 2/2018 | Kinkade | H04L 65/403 |
| 10,078,574 B2 | 9/2018 | Lopian | |
| 10,275,600 B2 | 4/2019 | Wysopal et al. | |
| 10,289,630 B2 | 5/2019 | Catania et al. | |
| 2003/0101150 A1 | 5/2003 | Agnihotri et al. | |
| 2003/0122871 A1 | 7/2003 | Darlet et al. | |
| 2003/0167398 A1* | 9/2003 | Sueyoshi | G06F 21/6245 713/189 |
| 2004/0236943 A1* | 11/2004 | Edwards | H04L 63/0428 713/161 |
| 2005/0010911 A1* | 1/2005 | Kim | G06F 8/54 717/140 |
| 2005/0183072 A1 | 8/2005 | Horning et al. | |
| 2006/0053155 A1* | 3/2006 | Suga | G06F 21/64 |
| 2006/0129817 A1* | 6/2006 | Borneman | G06F 21/41 713/170 |
| 2007/0016688 A1* | 1/2007 | Hester | H04L 67/32 709/238 |
| 2007/0022420 A1* | 1/2007 | Yamamoto | G06F 8/61 717/177 |
| 2008/0005114 A1* | 1/2008 | Li | G06F 17/30209 |
| 2008/0133929 A1* | 6/2008 | Gehrmann | G06F 21/51 713/179 |
| 2009/0144559 A1* | 6/2009 | Lee | G06F 21/575 713/189 |
| 2009/0150487 A1* | 6/2009 | Wolfish | G07F 7/1008 709/203 |
| 2010/0017506 A1* | 1/2010 | Fadell | H04M 15/00 709/224 |
| 2010/0031036 A1* | 2/2010 | Chauncey | H04L 63/0428 713/168 |
| 2010/0094817 A1* | 4/2010 | Ben-Shaul | G06F 16/174 707/697 |
| 2012/0246226 A1* | 9/2012 | Anandam | H04L 67/06 709/203 |
| 2012/0303963 A1* | 11/2012 | Murao | G06F 21/64 713/178 |
| 2012/0311546 A1 | 12/2012 | Fanning et al. | |
| 2013/0080403 A1* | 3/2013 | Yamakawa | G06F 3/0661 707/690 |
| 2013/0080573 A1* | 3/2013 | Boliek | H04L 63/0428 709/217 |
| 2013/0311434 A1* | 11/2013 | Jones | G06F 3/061 707/692 |
| 2014/0040616 A1* | 2/2014 | Barber | G06F 11/1453 713/168 |
| 2014/0143647 A1* | 5/2014 | Reshadi | G06F 17/30902 715/234 |
| 2014/0156687 A1* | 6/2014 | Chen | G06F 16/9558 707/758 |
| 2014/0304512 A1 | 10/2014 | Kotov et al. | |
| 2015/0033207 A1 | 1/2015 | Fung et al. | |
| 2015/0039872 A1 | 2/2015 | Jorden et al. | |
| 2015/0199261 A1 | 7/2015 | Paveza et al. | |
| 2015/0215570 A1* | 7/2015 | Leibow | G06F 3/14 386/231 |
| 2015/0229593 A1 | 8/2015 | Parker | |
| 2015/0293815 A1* | 10/2015 | Harel | G06F 11/3034 707/649 |
| 2015/0309813 A1 | 10/2015 | Patel | |
| 2015/0312044 A1* | 10/2015 | Tonegawa | H04L 9/3247 713/176 |
| 2015/0317167 A1* | 11/2015 | Zhou | G06F 9/445 717/166 |
| 2015/0365463 A1 | 12/2015 | Quan et al. | |
| 2016/0103712 A1* | 4/2016 | Thakkar | G06F 9/4856 707/610 |
| 2016/0188878 A1* | 6/2016 | Kulkarni | G06F 21/567 726/23 |
| 2016/0192188 A1* | 6/2016 | Coulier | H04W 12/04 |
| 2017/0075686 A1* | 3/2017 | Ko | G06F 9/06 |
| 2018/0005153 A1 | 1/2018 | Ferguson | |
| 2018/0032420 A1 | 2/2018 | Wadsworth | |
| 2018/0267796 A1* | 9/2018 | Kennedy | G06F 8/61 |
| 2019/0108099 A1 | 4/2019 | Mazumdar | |

OTHER PUBLICATIONS

Cheng et al., Toward arbitrary mapping for debugging visualizations, 4 pages (Year: 2016).

Lopes et al., DéjaVu: a map of code duplicates on GitHub, 28 pages (Year: 2017).

U.S. Appl. No. 15/861,429, filed Jan. 3, 2018, Notice of Allowance dated Oct. 10, 2019.

U.S. Appl. No. 15/964,569, filed Apr. 27, 2018, Non-Final Office Action dated Feb. 21, 2020.

* cited by examiner

US 10,853,057 B1

SOFTWARE LIBRARY VERSIONING WITH CACHING

BACKGROUND

Software development is largely structured around the concepts of abstraction and code reuse. If a certain segment of code in a program is going to be invoked in multiple situations, it makes sense to create a new function that includes the segment of code. The function can be called multiple times, thereby simplifying the program. If an aspect of the code segment needs to be changed, the change can often be made only by modifying the body of the function rather than separately modifying the program at each instance of invocation. When functions and data are shared among multiple programs, the functions and data can be structured as a library.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates generally to software library versioning with caching. In an organization, multiple teams may independently work on software. Code developed by one team may be useful for multiple applications maintained by the team, as well as for applications maintained by other teams. Accordingly, code that may be susceptible for reuse in multiple applications or across teams may be distributed as a library.

If the library is distributed to clients over the network, it is desirable to avoid the data transfer associated with sending the library over the network to the same client multiple times for multiple application. Furthermore, a versioning system may be necessary to ensure that each application has an appropriate version of a library on which it depends. For example, a first team may make a change to a library upon which an application developed by a second team depends, potentially without notifying the second team. If the previous version is not preserved, the application may fail.

Various embodiments of the present disclosure introduce a versioning approach to software libraries with an intelligent caching architecture. Libraries are distributed in tandem with signatures to verify the integrity of the library. Any changes to the library would also change the signature, which allows for specific version control. Caching with deduplication may be employed to reduce network data transfer as well as to speed loading of the library at clients. In some embodiments, cached usage of libraries (as opposed to new downloads of libraries) may be tracked to enable sharing of network-associated costs among teams. The principles of the present disclosure can be applied also to an application marketplace such as an "app store," where applications offered by different organizations may share common libraries as will be described.

Figure 1:
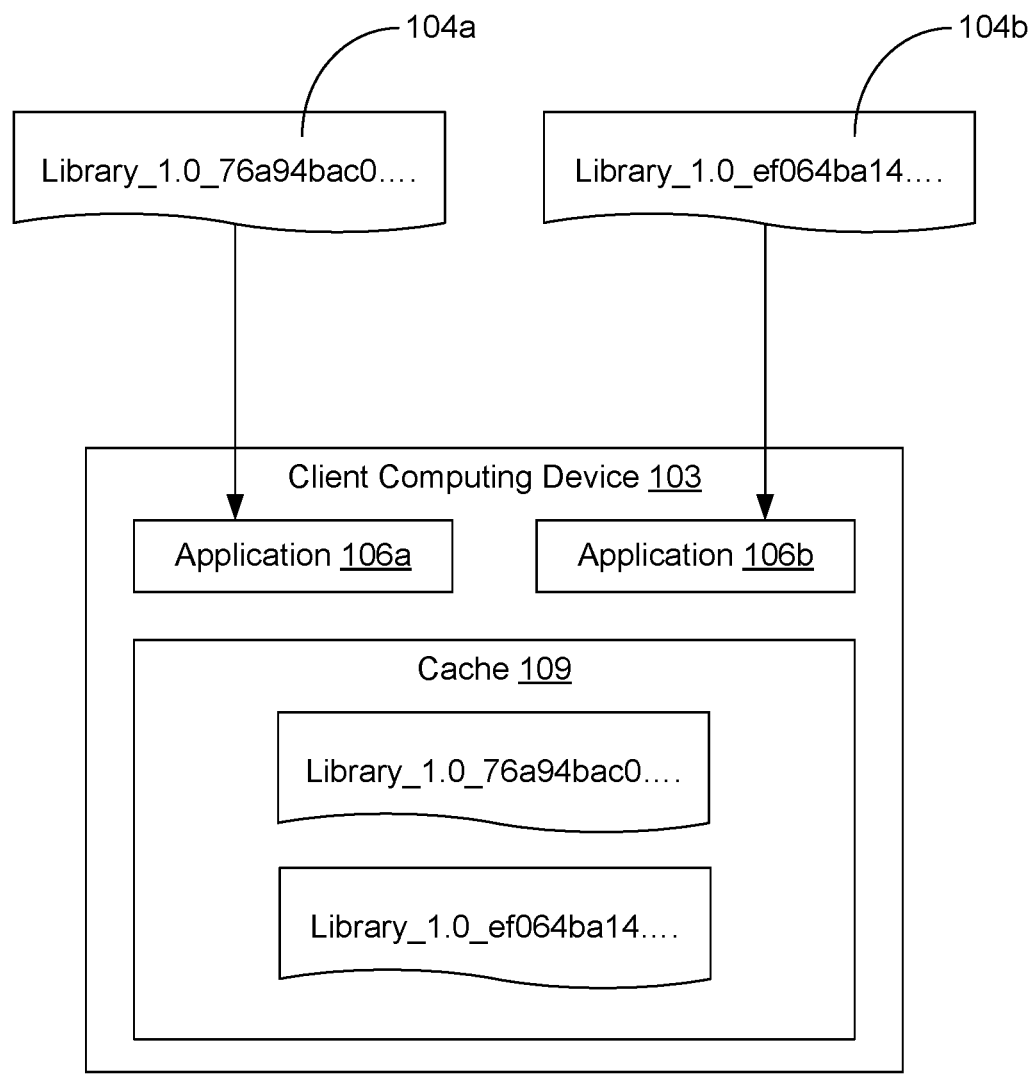
FIG. 1 is a drawing of an example scenario involving caching of software library versions in accordance with an embodiment of the present disclosure.

Referring now to FIG. 1, shown is a drawing of an example scenario 100 involving caching of software library versions in accordance with an embodiment of the present disclosure. A client computing device 103 includes at least two applications 106a and 106b. Each of the applications 106a and 106b has a respective dependency on a software library having two versions 104a and 104b. Specifically, the application 106a depends on the version 104a, and the application 106b depends on the version 104b.

The software library in both versions 104a and 104b has the same major and minor version number (i.e., "1.0"), but the content of the versions 104a and 104b may differ in a minor way such that a signature of the respective versions 104a and 104b ultimately differs. For example, the version 104a may have a signature of "76a94bac0 . . . ," while the version 104b may have a signature of "ef064ba14 . . . ."

Because the signatures of the versions 104a and 104b differ in some respect, both of the versions 104a and 104b are cached separately in a client-side cache 109, which is indexed by signatures. If the same applications 106 or other applications 106 have a dependency on the respective versions 104a and 104b, the respective versions 104a and 104b can subsequently be loaded from the cache 109, rather than being downloaded over a network. In the following discussion, a general description of the system and its components is provided, followed by a discussion of the operation of the same.

Figure 2:
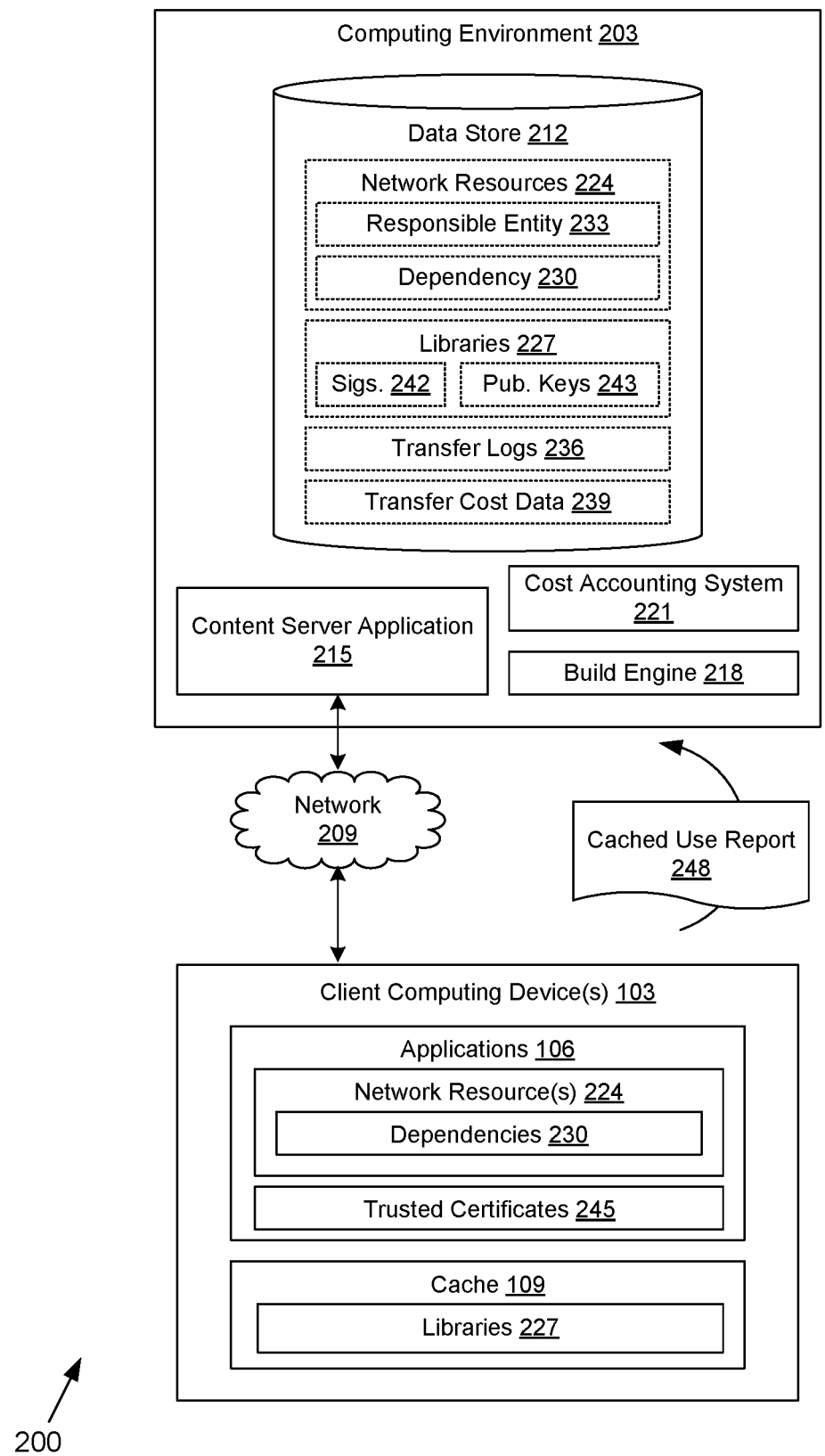
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client computing devices 103, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content server application 215, a build engine 218, a cost accounting system 221, and other applications, services, processes, systems, engines, or functionality not discussed in detail herein. The content server application 215 is executed to transfer network resources 224 and libraries 227 to client computing devices 103 via the network 209 in response to requests from client computing devices 103. The content server application 215 may include a hypertext transfer protocol (HTTP) server such as APACHE TOMCAT, APACHE HTTP Server, MICROSOFT Internet Information Services (IIS), or another server. Additionally, the content server application 215 may include code that dynamically generates at least a portion of the network resources 224 upon request.

The build engine 218 is employed to generate an application 106 and/or a network resource 224. The build engine 218 may perform various tasks including compiling, programming language translation, software packaging, and/or other tasks. In particular, the build engine 218 may generate dependencies 230 in the network resources 224 according to various rules.

The cost accounting system 221 is executed to maintain a cost accounting for transfers of libraries 227 and/or other resources such that costs are properly attributed to responsible entities 233. For instance, data transfer across the network 209 may be associated with a data transfer cost, which may be based at least in part on factors such as amount of data transfer, bandwidth, data center, availability zones, destination, time, and so forth. The responsible entity 233 may be charged for data transfer associated with network resources 224 that it manages.

The data stored in the data store 212 includes, for example, network resources 224, libraries 227, transfer logs 236, transfer cost data 239, and potentially other data. The network resources 224 may correspond to data and/or code that implement network pages or features therein, such as web pages or portions of web pages, mobile application content, or other forms of network content. To this end, the network resources 224 may include hypertext markup language (HTML), extensible markup language (XML), cascading style sheets (CSS), JavaScript, images, audio, video, and other data.

Each of the network resources 224 may have a responsible entity 233, such as a user or an organization (or a team or department within an organization) that is to bear costs associated with the network resources 224. Such costs may relate to processing time, data transfer, data storage, and so on. Also, the network resources 224 may have one or more dependencies 230 on libraries 227. The dependencies 230 may indicate or specify a signature 242 of the library 227.

In some cases, the dependencies 230 may take the form of a uniform resource identifier (URI) corresponding to the dependent library 227.

The libraries 227 may correspond to code or packages that are used by the network resources 224 (or applications 106 executed in a client computing device 103) for functionality or generation of content within the network resources 224. For example, the libraries 227 may include JavaScript code, VBScript code, a dynamic-link library (DLL), shared object code, native code, and/or other code that executes client-side. Each version of the libraries 227 is associated with a unique signature 242 generated by a private key of a public/private key pair. The signatures 242, potentially along with major and/or minor version numbers, may be taken to indicate the version of the library 227. The signature 242 is generated by the build engine 218 using a cryptographic hash function, such as SHA-256 or another algorithm using a private key. A client computing device 103 can verify the integrity of the library 227 and its source using a public key 243 that is paired with the private key. The public key 243 can be verified as authentic as being chained to a trusted certificate 245 that is pinned on the client computing device 103.

The signature 242 and the public key 243 are kept in association with the library 227 according to various approaches. In a first approach, the signature 242 is embedded in a filename or path of a URI of the library 227. For example, the signature 242 may be encoded into hexadecimal digits and appended to the filename of the library 227. In a second approach, the signature 242 and the public key 243 may be distributed with the library 227 in an envelope format, such that the signature 242 and the public key 243 sent first, then the content of the library 227 follows. In a third approach, the signature 242 and the public key 243 are maintained in one or more separate files, where the filename or path of the file is related to the filename or path of the library 227 according to a predetermined format. As an example, the signature 242 may have the same filename as the library 227 but with the extension ".sig" appended, while the public key 243 may have the same filename as the library 227 but with the extension ".pub" appended. As another example, the URI of the signature 242 (or the URI of the public key 243) and the URI of the library 227 may differ according to a portion of a path.

The transfer logs 236 may track the transfer of network resources 224 and libraries 227 to client computing devices 103 via the network 209. A transfer of a given library 227 may be recorded in association with an identification of the network resource 224 for cost accounting purposes. The transfer logs 236 may record parameters such as bytes transferred, maximum transfer rate, time, data center, destination network address, and other parameters for cost accounting. The transfer cost data 239 assigns data transfer cost for libraries 227 and network resources 224 to responsible entities 233. As will be described, the data transfer cost for a shared library 227 may be equitably divided among multiple responsible entities 223 in the situation where the library 227 is cached on the client computing device 103, thereby avoiding a subsequent data transfer of the same library 227 to the client computing device 103.

The client computing device 103 is representative of a plurality of client devices that may be coupled to the network 209. The client computing device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client computing device 103 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 103 may be configured to execute various applications, such as applications 106. The applications 106 may be executed in a client computing device 103, for example, to access network content served up by the computing environment 203 and/or other servers, thereby rendering a user interface on the display. To this end, the application 106 may comprise, for example, a browser, a dedicated application, etc., and the user interface may comprise a network page, an application screen, etc. The applications 106 obtain network resources 224 from the content server application 215, which may include dependencies 230 on libraries 227.

The applications 106 may be configured to verify the integrity and authenticity of the libraries 227 using the respective signatures 242 and public keys 243 distributed together with the libraries 227. The verification of the signature 242 is performed using the respective public key 243, and the public key 243 may be verified as authentic by chaining to a trusted certificate 245 that is pinned in the client computing device 103. The trusted certificate 245 may be distributed along with the applications 106. Once the libraries 227 are verified, they may be stored in a cache 109 that is local to the client computing device 103. When a library 227 is later loaded from the cache 109, the application 106 dependent upon the library 227 can send a cached use report 248 to the computing environment 203 via the network 209 for cost accounting purposes. The client computing device 103 may be configured to execute applications beyond the applications 106, such as, for example, email applications, social networking applications, word processors, spreadsheets, and/or other applications.

Figure 3A:
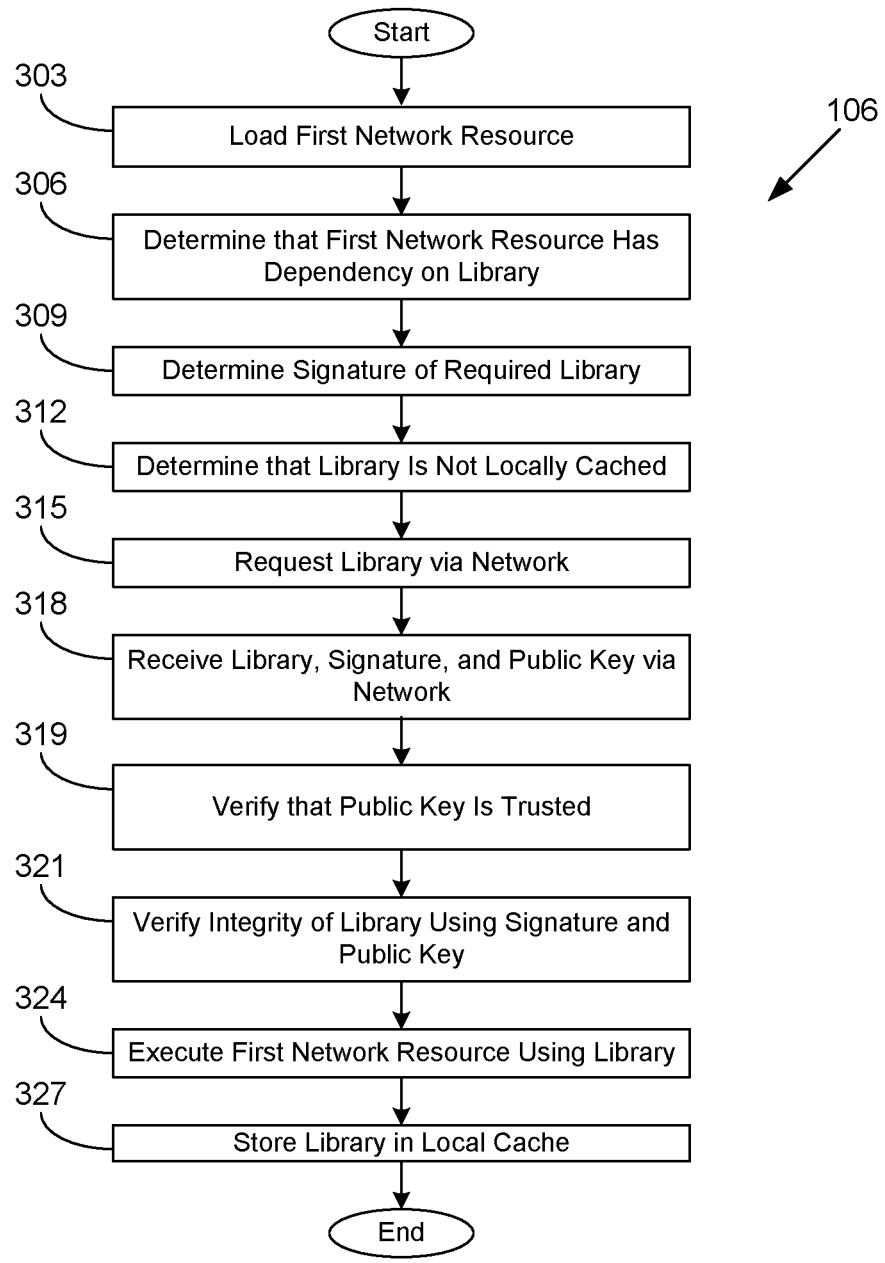
FIGS. 3A and 3B are flowcharts illustrating examples of functionality implemented as portions of applications executed in a client computing device in the networked environment of FIG. 2 according to various embodiments of the present disclosure.

Referring next to FIG. 3A, shown is a flowchart that provides one example of the operation of a portion of the application 106 involving download of a library 227 (FIG. 2) according to various embodiments. It is understood that the flowchart of FIG. 3A provides merely an example of the many different types of functional arrangements that may be employed to implement the operation of the portion of the application 106 as described herein. As an alternative, the flowchart of FIG. 3A may be viewed as depicting an example of elements of a method implemented in the client computing device 103 (FIG. 2) according to one or more embodiments.

Beginning with box 303, the application 106 loads a first network resource 224 (FIG. 2). For example, a user may navigate to a specific screen of the application 106 or to a specific network page onto which the first network resource 224 is embedded. In box 306, the application 106 determines that the first network resource 224 has a dependency 230 (FIG. 2) on a library 227. In box 309, the application 106 determines a signature 242 of the required library 227. For example, the dependency 230 may specify a certain uniform resource identifier (URI) for the library 227 that includes a portion corresponding to the signature 242.

In box 312, the application 106 determines that the library 227 is not locally cached. To this end, the application 106 may query the cache 109 (FIG. 2) using the signature 242 to determine that the library 227 with the same version and signature 242 has not already been stored in the cache 109. In box 315, the application 106 requests the library 227 from the content server application 215 (FIG. 2) via the network 209 (FIG. 2). The application 106 may also initiate a distinct request for the signature 242 in some embodiments. In some embodiments, the request may be made to access the library 227 from a different memory location in the same computing device (e.g., protected memory or kernel memory), rather than over the network 209.

In box 318, the application 106 receives the library 227, the corresponding signature 242, and the corresponding public key 243 (FIG. 2) together via the network 209. In box 319, the application 106 verifies that the public key 243 is authentic and trusted by determining that the public key 243 is chained to a pinned trusted certificate 245 (FIG. 2). In box 321, the application 106 verifies the integrity and source of the library 227 using the signature 242 and the public key 243. Specifically, the application 106 may execute a cryptographic verification algorithm such as a hashing function on the library 227 using the public key 243. The result can be compared to the signature 242 to assess authenticity. If the integrity or authenticity of the library 227 cannot be properly verified using the signature 242, an error may be surfaced via a user interface, and the loading of the library 227 may stop.

In box 324, the application 106 executes the first network resource 224 using the verified library 227. For example, the first network resource 224 may include dynamic hypertext markup language (DHTML) that uses JavaScript stored in the library 227. In box 327, the application 106 stores the library 227 in a local cache 109 for future accesses, where the library 227 may be indexed by signature and/or name and version number. Thereafter, the operation of the portion of the application 106 ends.

Figure 3B:
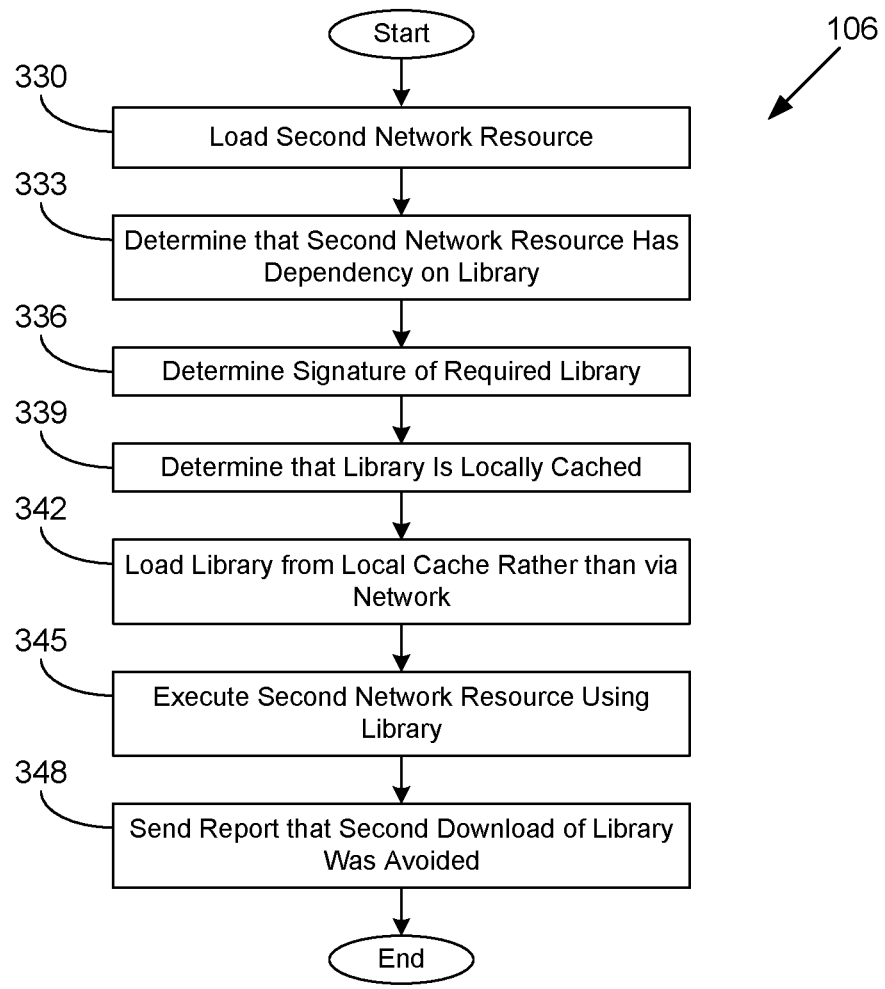

Turning now to FIG. 3B, shown is a flowchart that provides one example of the operation of a portion of another application 106 involving loading of a cached library 227 (FIG. 2) according to various embodiments. It is understood that the flowchart of FIG. 3B provides merely an example of the many different types of functional arrangements that may be employed to implement the operation of the portion of the application 106 as described herein. As an alternative, the flowchart of FIG. 3B may be viewed as depicting an example of elements of a method implemented in the client computing device 103 (FIG. 2) according to one or more embodiments.

Beginning with box 330, the application 106 loads a second network resource 224 (FIG. 2). In box 333, the application 106 determines that the second network resource 224 has a dependency 230 (FIG. 2) on a library 227, which happens to be the same version of the library 227 as referenced in the flowchart of FIG. 3A. In box 336, the application 106 determines the signature 242 of the required library 227. In box 339, the application 106 determines that the library 227 is locally cached in the cache 109. For example, the application 106 may query the cache 109 using the signature 242. In box 342, the application 106 loads the library 227 from the local cache 109 rather than via the network 209 (FIG. 2), thereby avoiding a second download of the library 227 to the client computing device 103.

In box 345, the application 106 executes the second network resource 224 using the library 227 that has been loaded from the cache 109. In box 348, the application 106 sends a cached use report 248 (FIG. 2) to the computing environment 203 (FIG. 2) that reports that a second download of the library 227 was avoided through the use of the locally cached copy. Thereafter, the operation of the portion of the application 106 ends.

Figure 4:
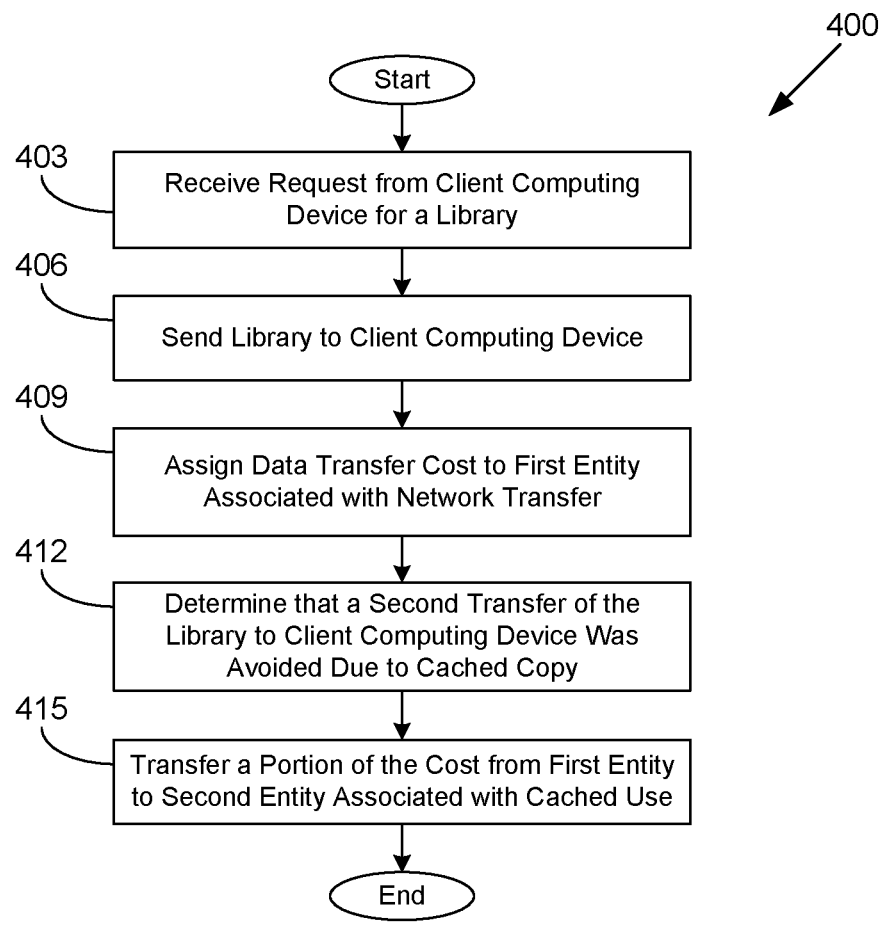
FIG. 4 is a flowchart illustrating one example of functionality implemented as portions of a content server application and a cost accounting system executed in a computing environment in the networked environment of FIG. 2 according to various embodiments of the present disclosure.

Moving on to FIG. 4, shown is a flowchart 400 that provides one example of the operation of portions of the content server application 215 (FIG. 2) and the cost accounting system 221 (FIG. 2) according to various embodiments. It is understood that the flowchart of FIG. 4 provides merely an example of the many different types of functional arrangements that may be employed to implement the operation of the portions of the content server application 215 and the cost accounting system 221 as described herein. As an alternative, the flowchart of FIG. 4 may be viewed as depicting an example of elements of a method implemented in the computing environment 203 (FIG. 2) according to one or more embodiments.

Beginning with box 403, the content server application 215 receives a request from a client computing device 103 (FIG. 2) via the network 209 (FIG. 2) for a library 227 (FIG. 2). The request is initiated according to a dependency 230 (FIG. 2) in a network resource 224 (FIG. 2) being presented by an application 106 (FIG. 2). The request may include an identification of the dependency 230, the network resource 224, and/or the application 106. In box 406, the content server application 215 sends the library 227 to the client computing device 103 via the network 209 in response to the request.

The content server application 215 may log information regarding the request or the transfer in the transfer logs 236 (FIG. 2). In box 409, based on the transfer, the cost accounting system 221 assigns a data transfer cost associated with the transfer of the library 227 to a first responsible entity 233 (FIG. 2) associated with the dependency 230. For example, the first responsible entity 233 may be the team, business unit, department, or organization responsible for the application 106 or the network resource 224 that includes the dependency 230.

In box 412, the cost accounting system 221 determines that a second transfer of the library 227 to the client computing device 103 was avoided due to the use of a cached copy on the client computing device 103. For example, the cost accounting system 221 may receive a cached use report 248 (FIG. 2) from the client computing device 103 that indicates that a cached copy of the library 227 was used in lieu of a second download of the same library 227. The cached use report 248 may indicate the application 106, network resource 224, and/or dependency 230 that resulted in the initial download, as well as the application 106, network resource 224, and/or dependency 230 that resulted in the cached use.

Alternatively, the cost accounting system 221 may perform an analysis on the transfer logs 236 to determine instances where a network resource 224 having a dependency 230 on the library 227 was transferred to a client computing device 103, but no transfer of the library 227 was made. As another alternative, the transfer logs 236 may indicate instances where a signature 242 was transferred (either in a separate signature file or as the first portion of the library 227 in an envelope format), but the content of the library 227 was not transferred.

In box 415, the cost accounting system 221 transfers at least a portion of the data transfer cost that was tentatively assigned to the first responsible entity 233 to a second responsible entity 233 that is associated with the cached use. For example, the second responsible entity 233 may be the team, business unit, department, or organization responsible for the application 106 or the network resource 224 that includes the second dependency 230. In this way, the data transfer cost for the shared library 227 is accounted for equitably among multiple organizational users of the library 227 and does not depend on which use was first and resulted in the download. Thereafter, the operation of the portion of the cost accounting system 221 ends.

Figure 5:
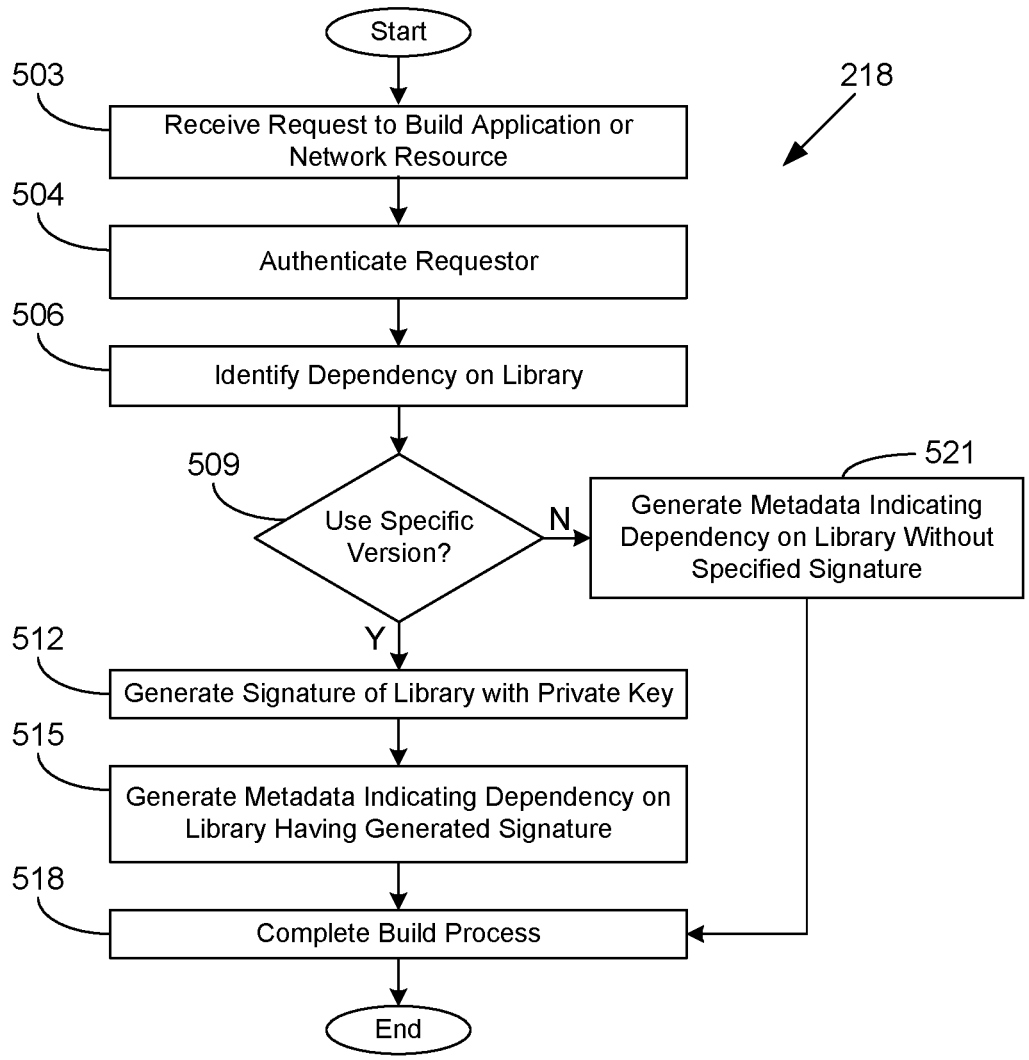
FIG. 5 is a flowchart illustrating one example of functionality implemented as portions of a build engine executed in a computing environment in the networked environment of FIG. 2 according to various embodiments of the present disclosure.

Referring next to FIG. 5, shown is a flowchart that provides one example of the operation of a portion of the build engine 218 according to various embodiments. It is understood that the flowchart of FIG. 5 provides merely an example of the many different types of functional arrangements that may be employed to implement the operation of the portion of the build engine 218 as described herein. As an alternative, the flowchart of FIG. 5 may be viewed as depicting an example of elements of a method implemented in the computing environment 203 (FIG. 2) according to one or more embodiments.

Beginning with box 503, the build engine 218 receives a request to build an application 106 (FIG. 2) or a network resource 224 (FIG. 2). In box 504, the build engine 218 authenticates the requestor by way of verifying a username, password, key, or other security credential. In box 506, the build engine 218 identifies a dependency 230 (FIG. 2) on a library 227. For example, the application 106 or network resource 224 may include a statement importing the library 227.

In box 509, the build engine 218 determines whether the dependency 230 requires a specific version of the library 227. If so, the build engine 218 moves to box 512 and generates a signature 242 (FIG. 2) for the library 227 using the private key of a public/private key pair. In box 515, the build engine 218 generates metadata for the application 106 or the network resource 224 indicating the dependency 230 (FIG. 2) on the library 227 having the signature 242 that has been generated. In box 518, the build engine 218 completes a build process.

If a specific version of the library 227 is not required, the build engine 218 instead moves from box 509 to box 521. In box 521, the build engine 218 generates metadata indicating the dependency 230 on the library 227 but not specifying a particular signature 242. In this way, the application 106 or network resource 224 may use a newer or different library 227 having an unspecified signature 242 that can still be verified using the trusted certificate 245 that is pinned in the client computing device 103. The build engine 218 then completes the build process in box 518. Thereafter, the operation of the portion of the build engine 218 ends.

Figure 6:
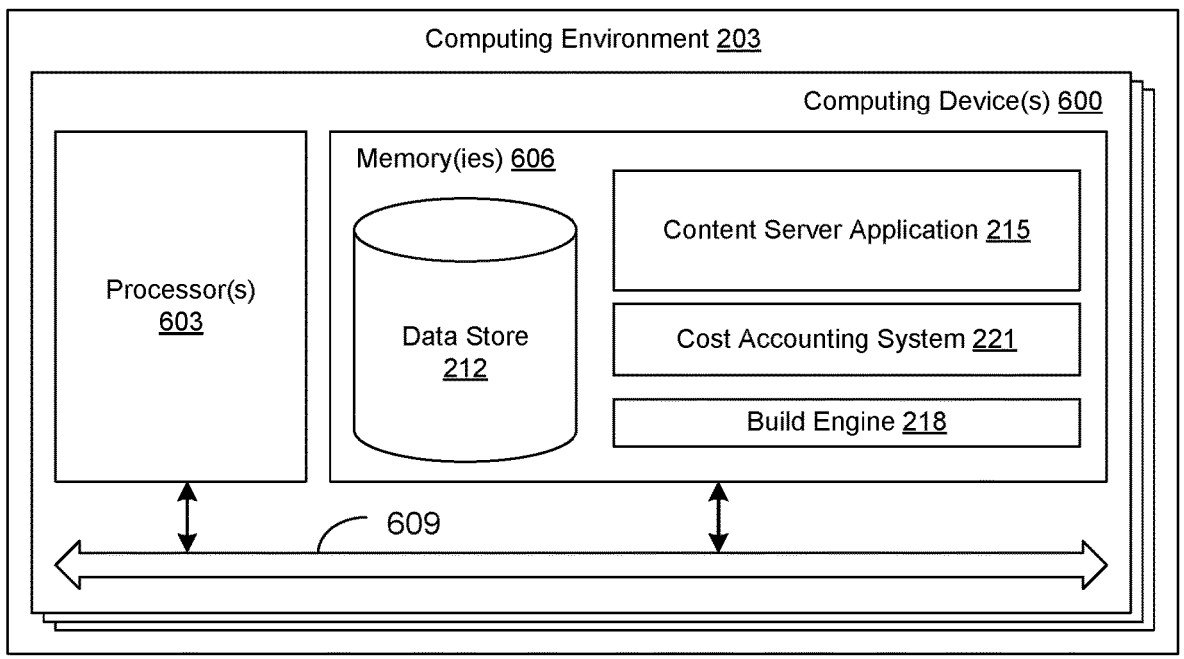
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the content server application 215, the cost accounting system 221, the build engine 218, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the content server application 215, the cost accounting system 221, the build engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-5 show the functionality and operation of an implementation of portions of the content server application 215, the cost accounting system 221, the build engine 218, and the applications 106 (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3A-5 show a specific order of execution, it is understood that the order of execution may differ from that which is depicted. For example, the order of execution of two or more blocks may be scrambled relative to the order shown. Also, two or more blocks shown in succession in FIGS. 3A-5 may be executed concurrently or with partial concurrence. Further, in some embodiments, one or more of the blocks shown in FIGS. 3A-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content server application 215, the cost accounting system 221, the build engine 218, and the applications 106, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content server application 215, the cost accounting system 221, the build engine 218, and the applications 106, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   instructions executable in the at least one computing device, wherein when executed the instructions cause the at least one computing device to at least:
   receive a request from a client computing device for a library, the request being generated by a first dependency;
   determine that the first dependency requires a version of the library;
   execute a cryptographic hash function using a private key as an input to generate a signature that identifies the version of the library in response to determining that the first dependency requires the version of the library;
   transfer the library together with the signature and a public key associated with the private key that is capable of verifying the signature to the client computing device in a first transfer via a network in response to the request;
   attribute a data transfer cost that results from the first transfer of the library to the client computing device via the network to a first entity associated with the first dependency;
   receive a request for a signature file via the network, the request being generated by a second dependency;
   determine that the request specifies the library having a same signature;
   transfer the signature file to the client computing device via the network;
   determine that a second transfer of the library generated by the second dependency was avoided due to a cached copy of the library stored on the client computing device based at least in part on a transfer log indicating at least one signature transfer without a content of the library; and
   reattribute a portion of the data transfer cost attributed to the first entity to a second entity associated with the second dependency.

2. The system of claim 1, wherein when executed the instructions further cause the client computing device to at least receive a report from the client computing device indicating that the second transfer was avoided and identifying the first dependency and the second dependency.

3. The system of claim 1, wherein when executed the instructions further cause the at least one computing device to at least:
   record an indication of the first transfer in the transfer log; and
   record an indication of the transfer of the signature file in the transfer log.

4. The system of claim 1, wherein the transfer log further comprises a plurality of parameters corresponding to the first transfer.

5. The system of claim 4, wherein the plurality of parameters corresponding to the first transfer comprises at least one of a number of bytes transferred, a maximum transfer rate, a time of transfer, and a destination network address.

6. The system of claim 1, wherein the library is transferred via the network in an envelope format containing the signature and the public key followed by the content of the library.

7. The system of claim 1, wherein the library is received having a filename that includes the signature.

8. A system, comprising:
   a client computing device; and
   instructions executable in the client computing device, wherein when executed the instructions cause the client computing device to at least:
   request a library in response to a first dependency in a first network resource, the first dependency requiring a version of the library;
   receive in a first download the library together with a signature that identifies the version of the library and a public key capable of verifying the signature, the public key being chained to a trusted certificate pinned by the client computing device, and a cost being attributed to a first entity associated with the first dependency based at least in part on the first download;
   verify an authenticity of the public key using the trusted certificate pinned by the client computing device;
   execute a cryptographic hash function using the public key as an input to the cryptographic hash function to obtain a hash value;
   verify an authenticity of the library by comparing the hash value with the signature;
   store the library in a local cache on the client computing device, the local cache being indexed by respective library signatures;

determine that a second network resource has a second dependency on the library;

determine that the second dependency specifies the library having a same signature;

request a signature file in response to the second dependency;

receive the signature file associated with the second dependency; and load the library from the local cache in response to the second dependency specifying the library having the same signature, thereby avoiding a second download of the library, a portion of the cost attributed to the first entity being reattributed to a second entity associated with the second dependency based at least in part on the second download being avoided.

9. The system of claim 8, wherein when executed the instructions further cause the client computing device to at least send, to a server, data reporting a loading of the library from the local cache rather than a download via a network, the loading being reported in association with an identification of the first network resource and an identification of the second network resource.

10. The system of claim 8, wherein the first dependency and the second dependency specify a uniform resource identifier (URI) that includes the same signature, the first dependency and the second dependency respectively specifying different URIs.

11. The system of claim 8, wherein the library is received via a network in an envelope format containing the signature and the public key followed by a content of the library.

12. The system of claim 8, wherein the signature is received via a first file, the library is received via a second file, and a first uniform resource identifier (URI) corresponding to the first file is determined according to a predetermined format based at least in part on a second URI corresponding to the second file.

13. The system of claim 8, wherein the library corresponds to at least one of: a JavaScript library or a dynamic-link library.

14. The system of claim 8, wherein the first network resource is managed by the first entity and received via a first application, and the second network resource is managed by the second entity and received via a second application.

15. The system of claim 8, wherein the library is received having a filename that includes the signature.

16. A method, comprising:

requesting, via at least one of one or more computing devices, a library via a network in response to a first dependency in a first client application, the first dependency requiring a version of the library;

receiving, via at least one of the one or more computing devices, in a first download, the library together with a signature that identifies the version of the library and a public key capable of verifying the signature, the public key being chained to a trusted certificate pinned by the first client application and a second client application, and a cost being attributed to a first entity associated with the first dependency based at least in part on the first download;

verifying, via at least one of the one or more computing devices, an authenticity of the public key using the trusted certificate pinned by the first client application and the second client application;

executing, via at least one of the one or more computing devices, a cryptographic hash function using the public key as an input to the cryptographic hash function to obtain a hash value;

verifying, via at least one of the one or more computing devices, an authenticity of the library by comparing the hash value with the signature;

storing, via at least one of the one or more computing devices, the library in a local cache, the local cache being indexed by respective library signatures;

determining, via at least one of the one or more computing devices, that the second client application has a second dependency on the library;

requesting, via at least one of the one or more computing devices, a signature file via the network in response to the second dependency;

receiving, via at least one of the one or more computing devices, the signature file associated with the second dependency;

determining, via at least one of the one or more computing devices, that the second dependency specifies the library having a same signature; and loading, via at least one of the one or more computing devices, the library from the local cache in response to the second dependency specifying the library having the same signature, thereby avoiding a second download of the library, a portion of the cost attributed to the first entity being reattributed to a second entity associated with the second dependency based at least in part on the second download being avoided.

17. The method of claim 16, further comprising sending, to a server, data reporting a loading of the library from the local cache rather than a download via the network, the loading being reported in association with an identification of the first client application and an identification of the second client application.

18. The method of claim 16, wherein the first dependency and the second dependency specify a uniform resource identifier (URI) that includes the same signature, the first dependency and the second dependency respectively specifying different URIs.

19. The method of claim 16, wherein the library is received via the network in an envelope format containing the signature and the public key followed by a content of the library.

20. The method of claim 16, wherein the signature is received via a first file, the library is received via a second file, and a first uniform resource identifier (URI) corresponding to the first file is determined according to a predetermined format based at least in part on a second URI corresponding to the second file.

* * * * *